(12) United States Patent
Or

(10) Patent No.: US 11,859,978 B2
(45) Date of Patent: Jan. 2, 2024

(54) SYSTEM AND METHOD FOR ESTIMATING A VELOCITY OF A VEHICLE USING INERTIAL SENSORS

(71) Applicant: Alma Technologies Ltd., Haifa (IL)

(72) Inventor: Barak Or, Haifa (IL)

(73) Assignee: ALMA Technologies Ltd., Haifa (IL)

( * ) Notice: Subject to any disclaimer, the term of this patent is extended or adjusted under 35 U.S.C. 154(b) by 0 days.

(21) Appl. No.: 18/334,451

(22) Filed: Jun. 14, 2023

(65) Prior Publication Data
US 2023/0324180 A1 Oct. 12, 2023

Related U.S. Application Data

(63) Continuation-in-part of application No. 17/979,126, filed on Nov. 2, 2022, now Pat. No. 11,725,945, which is a continuation-in-part of application No. PCT/IL2022/050064, filed on Jan. 16, 2022, which is a continuation-in-part of application No. 17/484,346, filed on Sep. 24, 2021, now abandoned, and a continuation-in-part of application No. 17/337,632, filed on Jun. 3, 2021, now abandoned.

(60) Provisional application No. 63/138,153, filed on Jan. 15, 2021.

(51) Int. Cl.
*G01C 21/16* (2006.01)
(52) U.S. Cl.
CPC .................... *G01C 21/16* (2013.01)
(58) Field of Classification Search
CPC ........................................ G01C 21/16
See application file for complete search history.

(56) References Cited

U.S. PATENT DOCUMENTS

| | | |
|---|---|---|
| 2018/0180420 A1 | 6/2018 | Korenberg |
| 2019/0204092 A1 | 7/2019 | Wheeler |
| 2020/0202521 A1 | 6/2020 | Joyce |
| 2020/0250473 A1 | 8/2020 | Elluswamy |
| 2020/0311514 A1 | 10/2020 | Speranzon |
| 2021/0033738 A1 | 2/2021 | Liang |
| 2021/0146949 A1 | 5/2021 | Martinez Covarrubias |

FOREIGN PATENT DOCUMENTS

CA    2733032 A1    8/2012

OTHER PUBLICATIONS

Dishashree Gupta, "Transfer learning and the art of using pretrained models in deep learning", Jun. 1, 2017, pp. 1-14; https://www.analyticsviahya.com/blog/2017/06/transfer-learning-the-art-of-fine-tuning-a-pretrained-model/.
International Search Report and Written Opinion for PCT Application No. PCT/IL2022/050064, dated May 11, 2022.
Office action for U.S. Appl. No. 17/484,346, dated Oct. 22, 2021.

*Primary Examiner* — Mathew Franklin Gordon
(74) *Attorney, Agent, or Firm* — PEARL COHEN ZEDEK LATZER BARATZ LLP

(57) ABSTRACT

A system and method for estimating a velocity of a vehicle, including obtaining readings of at least one inertial sensor that is attached to the vehicle, calculating a time difference between a time when an irregularity is sensed in a first location of the vehicle and a time when the irregularity is sensed in a second location of the vehicle, and calculating the velocity of the vehicle based on the time difference.

16 Claims, 12 Drawing Sheets

SYSTEM AND METHOD FOR ESTIMATING A VELOCITY OF A VEHICLE USING INERTIAL SENSORS

CROSS-REFERENCE TO RELATED APPLICATIONS

This application is a continuation-in-part of U.S. patent application Ser. No. 17/979,126 filed Nov. 2, 2022, which is a continuation-in-part of PCT Application No. PCT/IL2022/050064 filed Jan. 16, 2022, which is a continuation-in-part of U.S. patent application Ser. No. 17/337,632, filed Jun. 3, 2021, a continuation-in-part of U.S. patent application Ser. No. 17/484,346, filed Sep. 24, 2021, and which claims priority from U.S. Provisional Patent Application No. 63/138,153, filed Jan. 15, 2021, all of which are hereby incorporated by reference in their entireties.

FIELD OF THE INVENTION

The present invention relates generally to estimating a velocity of a vehicle and more specifically, to estimating a velocity of a vehicle using inertial sensors.

BACKGROUND OF THE INVENTION

In the field of localization and navigation of vehicles, inertial navigation system may provide estimates of position, velocity, and attitude of a vehicle. Inertial navigation systems, however, are prone to errors, due to various effects such as drift. An accurate velocity estimation may be used to correct position and velocity estimates of the inertial navigation systems to reduce those errors.

A speedometer of a vehicle may measure the velocity of the vehicle by measuring the wheel rotation velocity and multiplying the wheel rotation velocity by the wheel radius. However, some localization and navigation systems may not have access to the computer of the vehicle, and therefore cannot obtain the vehicle velocity as measured by the speedometer of the vehicle.

Therefore, a system and method for measuring the velocity of the vehicle is required, that is independent of the vehicle's speedometer.

SUMMARY OF THE INVENTION

A computer-based system and method for estimating a velocity of a vehicle may include: obtaining readings of at least one inertial sensor that is attached to the vehicle; calculating a time difference between a time when an irregularity is sensed in a first location of the vehicle and a time when the irregularity is sensed in a second location of the vehicle; and calculating the velocity of the vehicle based on the time difference.

According to embodiments of the invention, each of the at least one inertial sensor may measure at least one of accelerations and angular velocities at x, y and z directions.

According to embodiments of the invention, the at least one inertial sensor may include a single inertial sensor unit.

According to embodiments of the invention, calculating the time difference may include: performing auto correlation of an acceleration or autocorrelation of an angular velocity signal measured by the single inertial sensor unit; and finding a peak in the autocorrelation signal, where the time difference may be a time associated with the peak.

According to embodiments of the invention, calculating the velocity may include dividing a wheelbase of the vehicle by the time difference;

According to embodiments of the invention, the at least one inertial sensor may include two inertial sensor units.

According to embodiments of the invention, the two inertial sensor units may be located collinearly on a line parallel to a longitudinal axis of the vehicle, with a distance between them.

According to embodiments of the invention, a first inertial sensor unit of the two inertial sensor units may be located in a front end of the vehicle, and a second inertial sensor unit of the two inertial sensor units may be located in a rear end of the vehicle.

According to embodiments of the invention, calculating the time difference may include: performing cross-correlation between an acceleration signal measured by the first inertial sensor unit and a corresponding acceleration signal measured by the second inertial sensor unit; and finding a peak in the cross-correlation signal, where the time difference may be a time associated with the peak.

According to embodiments of the invention, calculating the time difference may include: performing cross-correlation between each one of three acceleration signals and three angular velocities measured by the first inertial sensor unit and a corresponding signal measured by the second inertial sensor unit; arranging the cross-correlation signals in a matrix; and calculating a time lag that optimizes a matrix property.

According to embodiments of the invention, the two inertial sensor units may be located collinearly on a single axle of the vehicle, to measure skid, understeer or oversteer.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

Figure 1A:
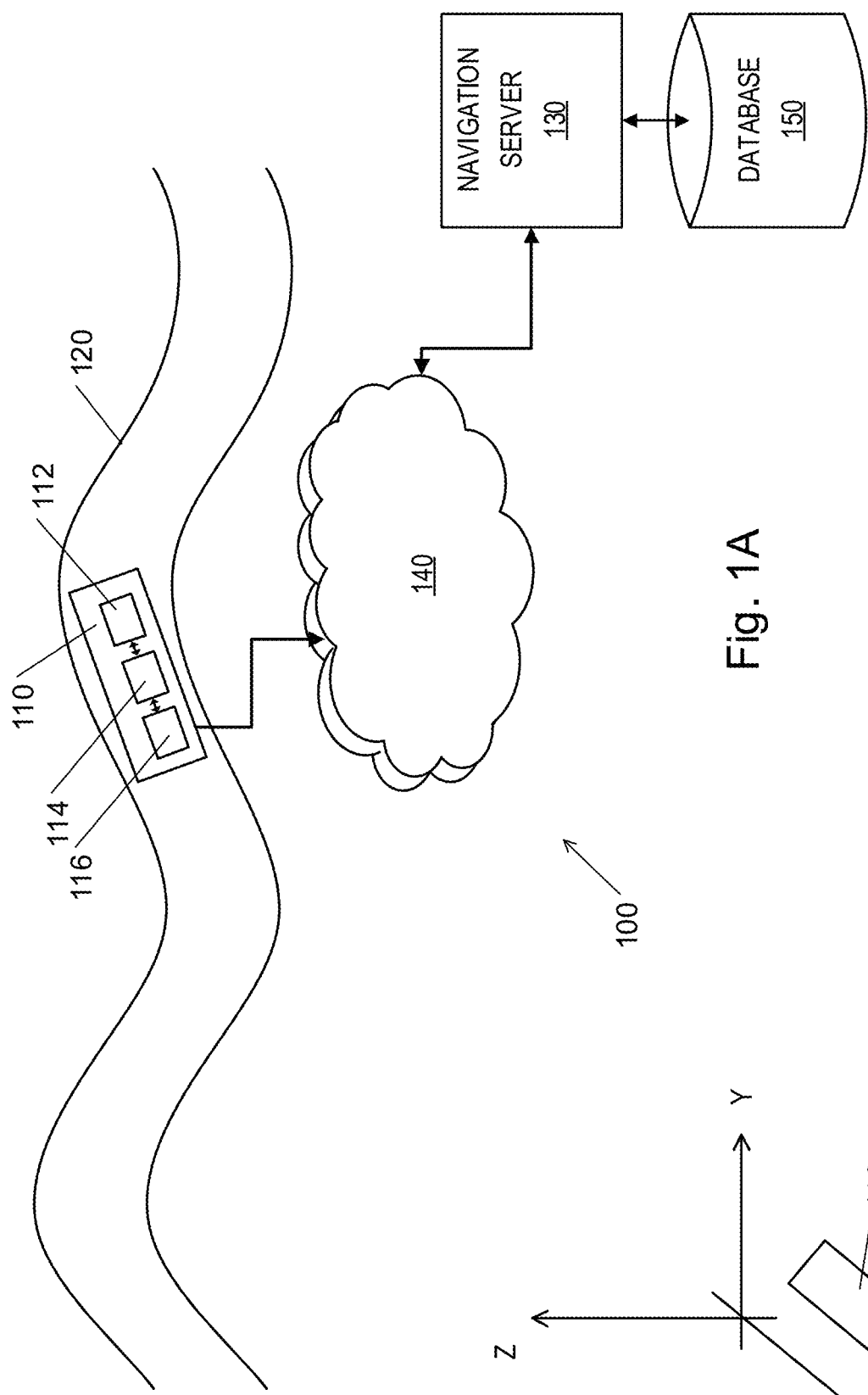
FIG. 1A depicts a system for providing a velocity of a vehicle, according to some embodiments of the invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Today, vehicles, cars, and other moving ground platforms, commonly referred to herein as vehicles, may use a speedometer to measure the velocity of the vehicle (e.g., the longitudinal velocity). A speedometer may measure the velocity of the vehicle by measuring the wheel rotation velocity and multiplying the wheel rotation velocity by the wheel radius. The speedometer may include sensors and a processing unit or module, which may be a part of or implemented by the vehicle computer. An accurate velocity estimation may be required by localization and navigation systems. However, in many applications, such localization and navigation systems do not have access to the computer of the vehicle, or to other extrinsic sensors such as global positioning system (GPS) receivers, cameras, LiDAR, RADAR, etc., and thus may not be able to obtain the velocity of the vehicle as measured by the speedometer.

Embodiments of the invention may provide an accurate measurement of the velocity of the vehicle, that is independent of the vehicle's speedometer. According to embodiments of the invention, the velocity of the vehicle may be estimated using one or more inertial sensors that may be physically coupled or installed in the vehicle. Embodiments of the invention may obtain signals measured by the one or more inertial sensors installed in the vehicle and may derive the velocity of the vehicle by processing these signals. According to embodiments of the invention, the velocity of the vehicle may be estimated by processing signals generated by inertial sensors only, e.g., no readings of other sensors other than the accelerometers and gyroscopes may be required.

An inertial sensor unit may be or may include an electronic device configured to measure at least one of the specific force, angular velocity, and the orientation of a vehicle, typically using one or more accelerometer and/or gyroscope. For example, an inertial sensor unit may be or may include an inertial measurement unit (IMU). An inertial sensor unit may include a three-dimensional accelerometer, to measure proper accelerations in the x, y and z directions, and a three-dimensional gyroscope, to measure angular velocities in the x, y and z directions. Where x, y, and z define a Cartesian coordinate system where the x and y axes are horizontal and the z axis is vertical. Moving along surfaces, roads, and other terrains results in a dynamic change of the readings of the inertial sensors. As such, the sensor readings contain intrinsic knowledge regarding the changes in location, which may be used to calculate the velocity of the vehicle.

Typical roads may include road or surface imperfections or defects, referred to herein as a geometrical signature of the road. The road or surface imperfections may include for example bumps, potholes, cave-ins, sinkholes, hummocks, defective street cuts, surface deterioration, edge failure, cracking, rutting, subsidence, etc. It is noted that road or surface imperfections may be generated as a natural process of road degradation, or intentionally generated for various reasons. Embodiments of the invention may take advantage of those road or surface imperfections. According to embodiments of the invention, the road imperfections may be sensed by the one or more inertial sensors that are installed in the vehicle and may be manifested as changes in the accelerations and angular velocities measured by the one or more inertial sensors. The one or more inertial sensors may provide acceleration and angular velocity signals, carrying information of the geometrical signature of the road. Analyzing at least a portion of these acceleration and angular velocity signals may provide an estimation of the velocity of the vehicle. In some embodiments, analyzing at least a portion of these accelerations and angular velocity signals may be performed using any applicable measure of similarity between one or two signals, e.g., autocorrelation and cross-correlation techniques.

According to some embodiments, two or more inertial sensors are installed on the vehicle, along a longitudinal axis of the vehicle. For example, a first inertial sensor may be located at a front end of the vehicle and a second inertial sensor may be located at a rear end of the vehicle. In some embodiments, a first inertial sensor may be located at a front wheel axle of the vehicle and a second inertial sensor may be located at a rear wheel axle of the vehicle. Thus, when driving over a road imperfection, each inertial sensor may sense a change in the accelerations and angular velocities of the vehicle in a different timing, depending on the distance between the front and rear wheels (e.g., the wheelbase). According to embodiments of the invention, this time differences may be measured, e.g., by performing cross-conelation between signals of the two sensors. Using the time difference and wheelbase, the velocity of the vehicle may be calculated.

According to some embodiments, one inertial sensor installed on the vehicle is sufficient for measuring the velocity of the vehicle. A single inertial sensor may capture road imperfections that are observed by both the front and rear wheels. For example, when driving forward, perturbations that originate at the front wheels reach the rear wheels after a period of time (e.g., a time difference or time lag) that depends on the distance between the front and rear wheels and the vehicle velocity. Thus, a single imperfection may be manifested twice in a single signal of an inertial sensor, successively, with a time lag between the two manifestations. When a certain imperfection is sufficiently large in magnitude and is not lost beneath the noise of the sensor (e.g., can be distinguished and detected), an autocorrelation of the single inertial sensor signal may reveal a distinct peak (other than the peak naturally located at time zero) at the time lag. The velocity of the vehicle may be estimated using the time lag and wheelbase.

Embodiments of the invention may improve the technology of vehicle navigation and localization, by providing a measurement of the velocity of the vehicle that is independent of the vehicle computing system. Embodiments of the invention may use as little as a single inertial sensor, or two inertial sensors to measure the velocity of the vehicle. The velocity measured according to embodiments of the invention may be presented to the driver, may be used in navigation algorithms to obtain position of the vehicle, e.g., by integrating the measurements with respect to time, and to calculate acceleration by deriving the measurement with respect to time. This velocity measurement may be used as a back-up for other velocity measurements.

FIG. 1A depicts a system 100 for providing a velocity of a vehicle 110, according to some embodiments of the invention. According to one embodiment of the invention, system 100 may include a vehicle 110, equipped with one or more inertial sensor unit 112, also referred to as sensor unit 112, that may measure and provide data including at least one of specific force, angular velocity and/or the orientation of a vehicle, typically using at least one of an accelerometer, a three-dimensional accelerometer, a gyroscope and/or a three-dimensional gyroscope. For example, sensor unit 112 may be or may include one or more inertial sensors or IMUs, e.g., that may be physically attached to the body of vehicle 110. Vehicle 110 may further include a processor 114 and a communication module 116 for initial processing and transmitting of data measured by sensor unit 112 to navigation server 130. In the example provided in FIG. 1A, vehicle 110 may be a vehicle moving along a road, way, path or route 120. This example is not limiting, and system 100 may include a vehicle moving in any area, such as a parking lot, a tunnel, a field, an urban canyon, or an indoor area. Processor 114 may provide, via communication module 116, the data measured by sensor unit 112 or the velocity reading to a navigation server 130 directly or through networks 140.

Networks 140 may include any type of network or combination of networks available for supporting communication between processor 114 and navigation server 130. Networks 140 may include for example, a wired, wireless, fiber optic, cellular or any other type of connection, a local area network (LAN), a wide area network (WAN), the Internet and intranet networks, etc. Each of navigation server 130 and processor 114 may be or may include a computing device, such as computing device 700 depicted in FIG. 11. One or more databases 150 may be or may include a storage device, such as storage device 730. In some embodiments, navigation server 130 and database 150 may be implemented in a remote location, e.g., in a 'cloud' computing system.

According to some embodiments of the invention, navigation server 130 may store in database 150 data obtained from processor 114 and other data, such as mapping of terrain and/or route 120, computational results, and any other data as required by the application. According to some embodiments of the invention, navigation server 130 may be configured to obtain accelerations and angular velocities over time of vehicle 110 moving in route 120 and calculate the velocity of vehicle 110 based on the runtime acceleration and angular velocities. According to some embodiments of the invention, processor 114 may calculate the velocity of vehicle 110 based on the runtime acceleration and angular velocities locally and send the velocity to navigation server 130.

Figure 1B:
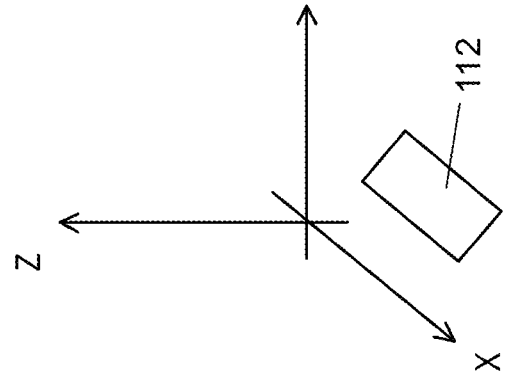
FIG. 1B presents a schematic illustration of sensor unit with relation to a Cartesian coordinate system, helpful in demonstrating embodiments of the invention.

FIG. 1B presents a schematic illustration of sensor unit 112 with relation to a Cartesian coordinate system, helpful in demonstrating embodiments of the invention. Sensor unit 112 may measure accelerations in the x, y and z directions (referred to herein as $a_x$, $a_y$ and $a_z$ respectively) and angular velocities in the x, y and z directions (referred to herein as $w_x$, $w_y$ and $w_z$ respectively), where the x-y plain is horizontal and the z-x and z-y plains are vertical.

Figure 2:
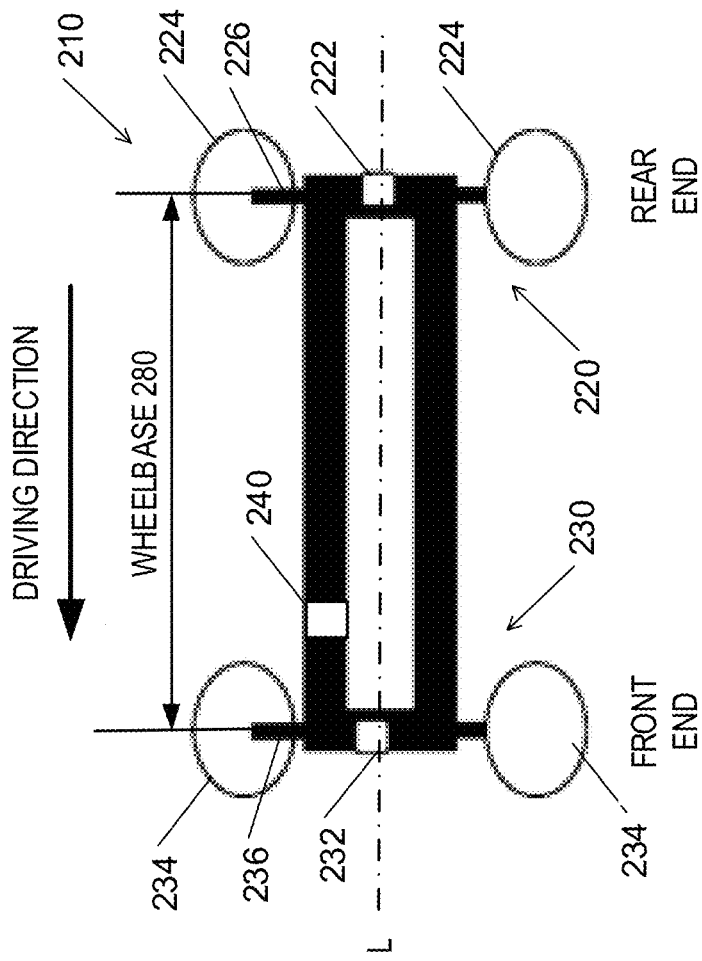
FIG. 2 depicts a vehicle, equipped with sensor units, according to embodiments of the invention.

Reference is now made to FIG. 2 which depicts a vehicle 210, equipped with sensor units 222 and 232, according to embodiments of the invention. Vehicle 210 may have a front end 230 with front wheels 234 and front wheel axle 236, and a rear end 220 with rear wheels 224 and rear wheel axle 226. Sensor units 222 and 232 (that may be similar to sensor unit 112) may be physically attached to the body of vehicle 210, and located collinearly on a line parallel to the vehicle longitudinal axis 1, e.g., each of sensor units 222 and 232 may be placed at different location along the longitudinal axis 1 of vehicle 210. In some embodiments, a first sensor unit 232, also referred to as front sensor unit 232, is located or installed in front end 230 of vehicle 210 and a second sensor unit, also referred to as rear sensor unit 222, is located or installed in a rear end 230 of vehicle 210. For example, front sensor unit 232 may be located or installed on the front wheel axle 236, and rear sensor unit 222 may be located or installed on the rear wheel axle 226. The readings of the front sensor unit 232 and rear sensor unit 222 may be synchronized in time. According to some embodiments, more than one front sensor unit 222 may be used, and may be located installed at the front end of vehicle 210, e.g., on the front wheel axle 236, and more than one rear sensor unit 232 may be used, and may be located installed at the rear end of vehicle 210, e.g., on the rear wheel axle 226.

Vehicle 210 may further be equipped with processor 240, that may be configured to obtain readings of first sensor unit 232 and second sensor unit 222. For example, processor 240 may be connected to front sensor unit 232 and rear sensor unit 222, and may acquire readings of front sensor unit 232 and rear sensor unit 222 cyclically one after the other, such that the readings are matched or paired together on each acquisition cycle. Processor 240 may label each pair with a timestamp. Processor 240 may create the timestamp using an inner system clock of processor 240 or with an external clock. Processor 240 may calculate a time difference between a time when a first irregularity is sensed by first sensor unit 232 in a first location of the vehicle, e.g., in front end 230, and a time when the irregularity is sensed in a second location of the vehicle, e.g., in rear end 220, e.g., using the timestamps, and may calculate the velocity of vehicle 210 based on the time difference.

Figure 3A:
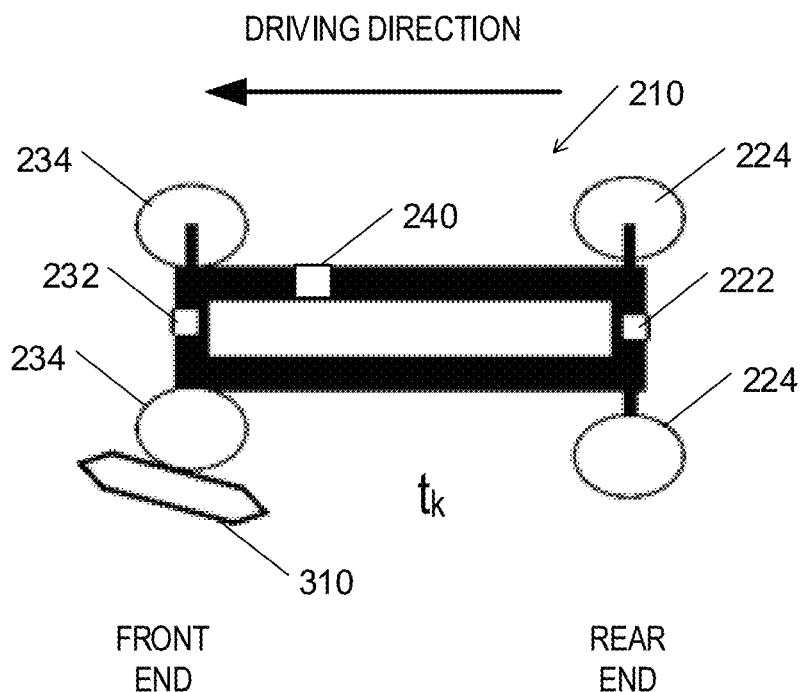
FIG. 3A depicts a vehicle when the front wheels of the vehicle are driving over a road imperfection in time $t_k$, according to embodiments of the invention.
Figure 3B:
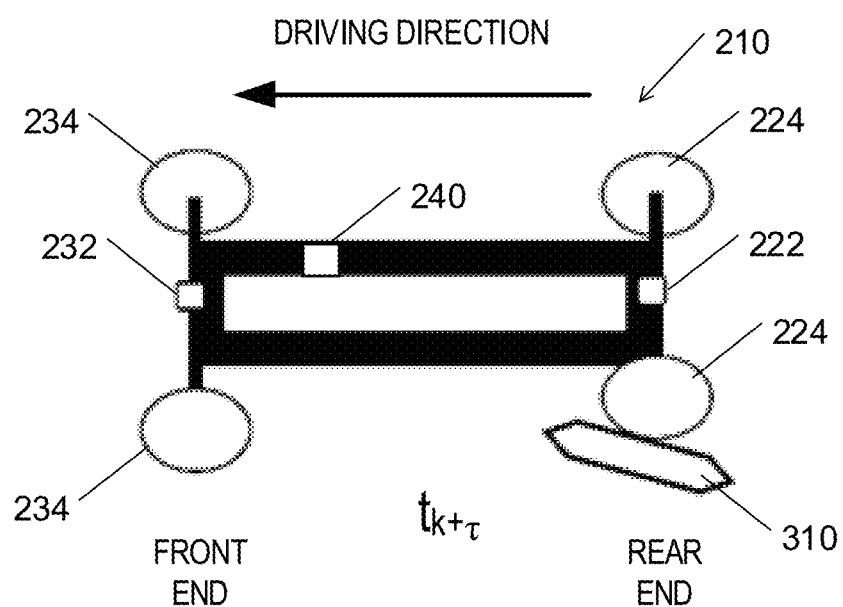
FIG. 3B depicts a vehicle when the rear wheels of the vehicle are driving over the road imperfection in time $t_{k+\tau}$, according to embodiments of the invention.

Reference is now made to FIGS. 3A and 3B, which depict vehicle 210 driving over a road imperfection 310, according to embodiments of the invention. FIG. 3A depicts vehicle 210 when the front wheels 234 of vehicle 210 are crossing or driving over road imperfection 310, in time $t_k$. Vehicle 210 keeps moving and FIG. 3B depicts vehicle 210 when the rear wheels 224 of vehicle 210 are crossing or driving over road imperfection 310, in time $t_{k+\tau}$. Where i denotes the time difference or time lag between the point in time in which the front wheels 234 of vehicle 210 are crossing or driving over road imperfection 310 and the point in time the rear wheels 224 of vehicle 210 are crossing or driving over road imperfection 310.

It may be assumed that when the front wheels 234 of vehicle 210 are crossing or driving over road imperfection 310, as depicted in FIG. 3A, a change in accelerations and angular rates of vehicle 210 may occur. This change in accelerations and angular rates of vehicle 210 may be sensed, picked or measured by front sensor unit 232. Thus, a change in accelerations and angular rates of vehicle 210 may be manifested in at least one signal measured by front sensor unit 232, e.g., as an irregularity. Similarly, it may be assumed that when the rear wheels 224 of vehicle 210 are crossing or driving over road imperfection 310, as depicted in FIG. 3B, a change in accelerations and angular rates of vehicle 210 may occur. This change in accelerations and angular rates of vehicle 210 may be sensed, picked or measured by rear sensor unit 222. Thus, a change in accelerations and angular rates of vehicle 210 may be manifested in at least one signal measured by rear sensor unit 222, e.g., as an irregularity. The time difference between the irregularities measured by front sensor unit 232 and rear sensor unit 222 may depend on the velocity of vehicle 210 and wheelbase 280. Since wheelbase 280 is known, the velocity of vehicle 210 may be calculated by finding the time difference, and solving the equations of motion, e.g., dividing the wheelbase 280 by the time difference.

According to embodiments of the invention, the time difference between the irregularities measured by front sensor unit 232 and rear sensor unit 222, referred to herein as the time lag, may be calculated using statistical methods, e.g., using cross-correlation between a signal measured by one or more front sensor units 232 and a corresponding signal (e.g., signal of the same type) measured by one or more rear sensor units 222. For example, cross-correlation between the acceleration in the direction normal to the road (the direction of the z-axis) measured by front sensor unit 232 and the acceleration in the direction normal to the road (the direction of the z-axis) measured by rear sensor unit 222 may be performed, e.g., by processor 114 or by navigation server 130. Performing cross-correlation between the two signals may reveal a peak in a time equal to the time lag τ*. The peak in the cross-correlation may be detected and the time lag τ* may be set to the time corresponding to this peak.

For example, the cross-correlation may be calculated by:

$$C(\tau) \triangleq E[x_{k-\tau} y_k^T]$$

$$C_k(\tau) \cong \frac{1}{ws} \sum_{i=k-ws+1}^{k} x_{i-\tau} y_i$$

$$\tau_k^* = \max_\tau C_k(\tau)$$

Where k is a time index or time step, $x_k \triangleq a_z^{IMU1}$ is the acceleration in the direction of the z-axis measured by front sensor unit 232, $y_k \triangleq a_z^{IMU2}$ is the acceleration in the direction of the z-axis measured by rear sensor unit 222, ws is a window size, E indicates Expected value operation, and $\tau_k^*$ is the time lag for time index or time step k. At each time step k the time lag for which the maximum value of the cross-correlation occurs, $\tau_k^*$, is found and used to compute an estimate for the speed of vehicle 210 according to, for example:

$$\hat{v}_k = \frac{D}{\tau_k^*}$$

Where, D is the wheelbase 280, $\hat{v}_k$ is the estimated velocity of vehicle 210 that is positive when vehicle 210 is driving forward and negative when vehicle 210 is driving backwards. For example, if D is measured along the longitudinal axis 1 of vehicle 210, then $\hat{v}_k$ is the estimated velocity of vehicle 210 in the longitudinal direction. According to some embodiments, readings of front sensor unit 232 and rear sensor unit 222 may be filtered before cross-correlations are performed. In some embodiments, the cross-correlation $C_k(\tau)$ is normalized. Normalization may be performed by dividing the cross-correlation $C_k(\tau)$ by the product of the standard deviation of $x_k \triangleq a_z^{IMU1}$ and $y_k \triangleq a_z^{IMU2}$.

According to some embodiments, the window size ws may be selected depending on the smallest velocity of interest min(v) at a given time of driving according to, for example:

$$ws = \alpha \frac{D}{\min(v)}, \alpha > 1$$

Where α is a constant but configurable constant greater than one.

In some embodiments, a plurality of front sensor units 232 are used. In this case, corresponding signals (e.g., signals of the same type) of the plurality front sensor units 232 may be unified, e.g., averaged, to increase the signal to noise ratio. Similarly, corresponding signals of more than one rear sensor units 222, if used, may be unified. The cross-correlation may be performed on the unified signals. In some embodiments, front sensor units 232 and rear sensor units 222 may be arranged in pairs, where each pair includes a front sensor unit 232 and rear sensor unit 222, the calculation of the time lag may be repeated for pairs of a front sensor unit 232 and averaged. Other methods may be used to unify readings of a plurality of front sensor units 232 and rear sensor units 222.

According to some embodiments, one or more front sensor units 232 and one or more rear sensor units 222 are installed on the front and rear wheel axles of vehicle 210, respectively, to decouple the measured accelerations and angular velocities from the dynamics of vehicle 210. The body of vehicle 210 may be connected to the wheel axles of vehicle 210 through a system of springs and dampers. An inertial sensor (e.g., an accelerometer or a gyroscope) attached to the body of vehicle 210 may experience the same springs and dampers which may change or dump the measured signal of accelerations and angular rates. An inertial sensor attached to the wheel axles of vehicle 210 may measure accelerations and angular rates that more closely represent the actual perturbations from the ground.

According to some embodiments, the front sensor unit 232 and rear sensor unit 222 (or pairs of a front sensor unit 232 and a rear sensor unit 222) are installed collinearly on a line parallel to the longitudinal vehicle axis 1 to reduce errors associated with geometrical factors. For example, if not placed on a line parallel to the longitudinal vehicle axis 1, the front sensor unit 232 and rear sensor unit 222 may sense different roll motion just as a result of the geometrical factors. According to some embodiments, more than one channel (e.g., measured signal over time, a signal may be one of accelerations in the x, y and z directions and angular velocities in the x, y and z directions) of front sensor unit 232 and rear sensor unit 222 are used to compute some or all elements of a cross-correlation matrix according to, for example:

$$\text{cross-correlation matrix} = C(\tau) = E[x_{k-\tau} y_k^T]$$

$$C_k \cong \frac{1}{ws} \sum_{i=k-ws+1}^{k} x_{i-\tau} y_i^T \in \mathbb{R}^{6 \times 6}$$

Where $x_k \triangleq [a_x, a_y, a_z, w_x, w_y, w_z]^T \in \mathbb{R}^{6 \times 1}$ is a vector of the accelerations in the x, y and z directions and angular velocities in the x, y and z directions measured by of front sensor unit 232, $y_k \triangleq [a_x, a_y, a_z, w_x, w_y, w_z]^T \in \mathbb{R}^{6 \times 1}$ is a vector of the accelerations in the x, y and z directions and angular velocities in the x, y and z directions measured by of rear sensor unit 222, $C(\tau)$ is a cross-correlation matrix. In some embodiments, the cross-correlation matrix includes one or more channels of one or more pairs of a front sensor unit 232 and a rear sensor unit 222. The elements of the cross-correlation matrix over time k, $C_k$, may be used to extract the time lag $\tau^*_k$ for which a matrix property is optimized. For example, the matrix property that is optimized may be the matrix 2-norm according to, for example:

$$\tau^*_k = \max_{\tau} \|C_k(\tau)\|_2^2$$

Other matrix property may be optimized to extract the time lag $\tau^*_k$ for example, other norm or the Eigenvalues of the cross-con-elation matrix may be optimized. According to embodiments of the invention, using additional channels may improve the clarity of the cross-correlation peak and may enable an easier and more reliable detection of the peak.

Embodiments of the invention may be used to determine horizontal skid, understeer or oversteer of vehicle 210, by installing two sensor units on the same axle, e.g., installing two sensor units on front wheel axle 236 or installing two sensor units on rear wheel axle 226, and calculating estimated horizontal speed of the axle and comparing the estimated value with a threshold value. A skid may refer to an unintentional sliding of vehicle 210 typically sideways as a result of rapid braking or turning. Oversteer may refer to a situation in which vehicle 210 turns more than the driver intended, and understeer may refer to a situation in which vehicle 210 turn less than the driver intended. Oversteer and understeer may be detected by comparing the estimated horizontal speed to an average of past horizontal speeds of the driver.

Figure 4:
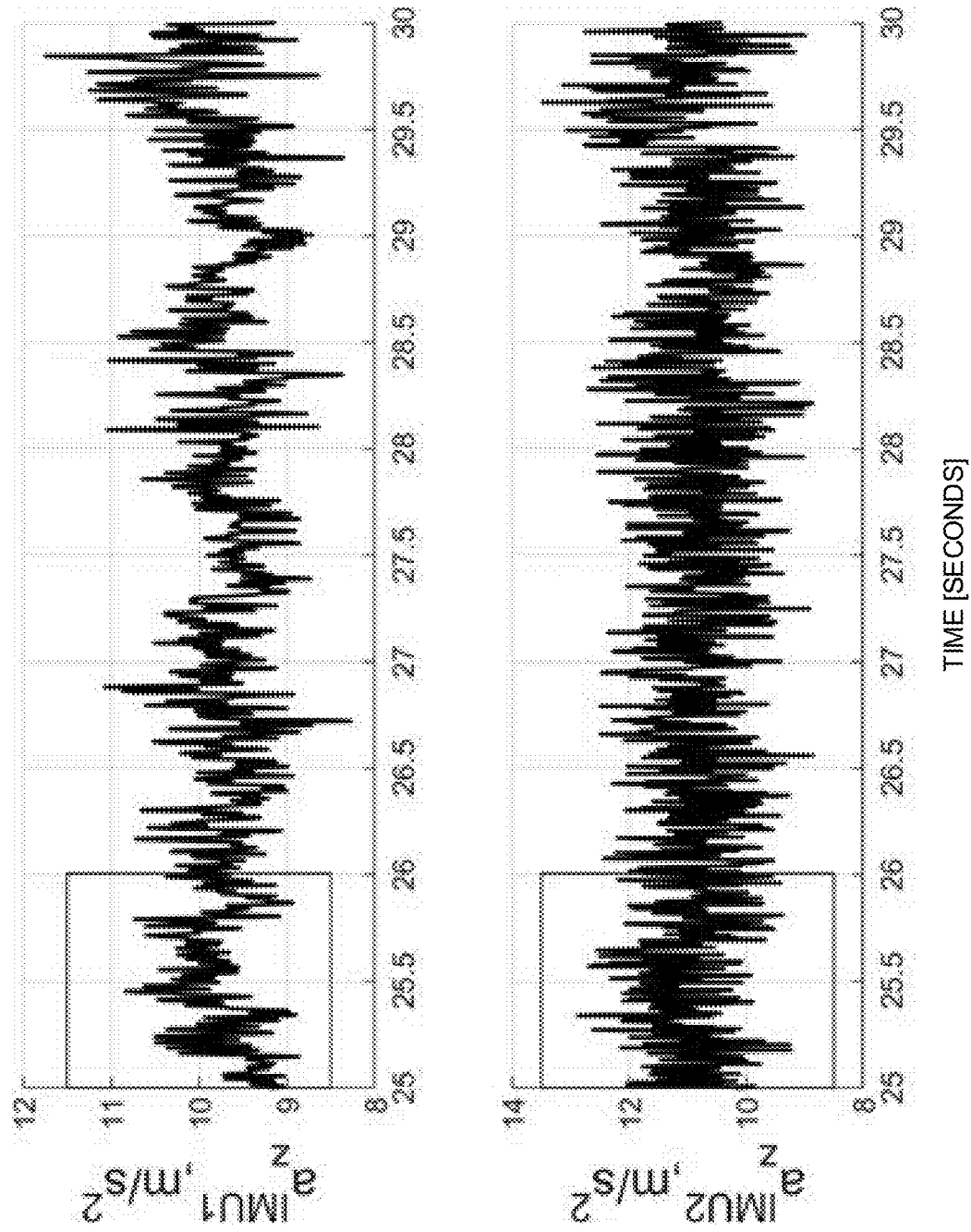
FIG. 4 depicts real and simulated accelerations of a real-world vehicle, according to some embodiments of the invention.

FIG. 4 depicts real and simulated accelerations of a real-world vehicle in the vertical direction (z-axis) measured using an IMU during a 5 seconds drive at a speed of 10.2 meters per second. The top graph (labeled as IMU1) is a measurement done by an IMU installed in a front end of a vehicle, and the bottom figure (labeled as IMU2) is a simulation of signals measured by an IMU located at a rear end of the vehicle. The simulated signal was generated by shifting the signal measured by the IMU in time and adding noise (signal to noise ratio in this simulation is equal to 5). The shift in time is equivalent to a horizontal distance of 1.5 meters between two sensors where the second sensor also measures more noise which may be due to proximity to the engine, for example. The rectangular square on the top and bottom plots shows the time interval where the cross-correlation is computed. In this example, a GPS is used to estimate the true speed.

Figure 5:
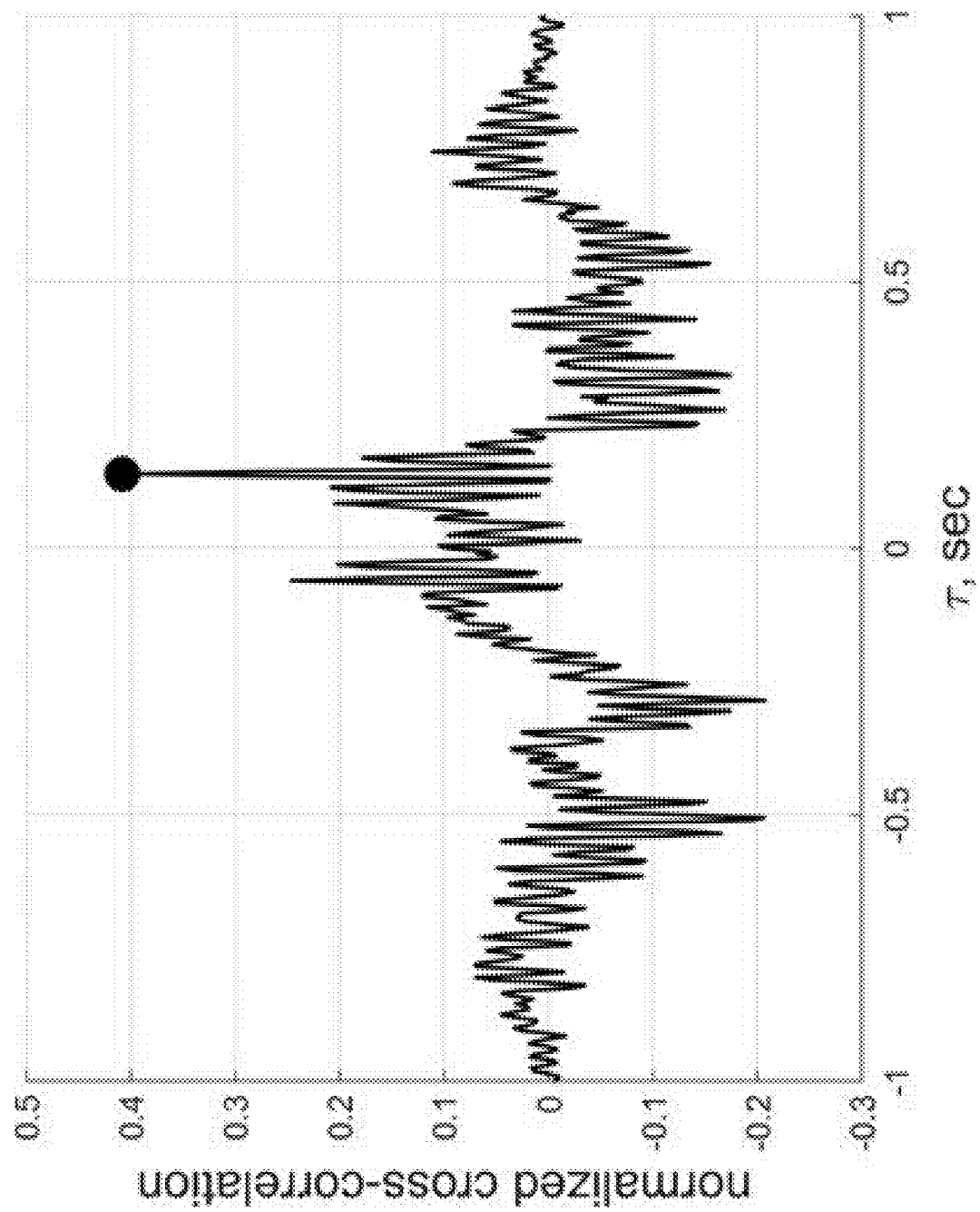
FIG. 5 depicts the normalized cross-correlation between the two acceleration signals depicted in FIG. 4, according to some embodiments of the invention.

FIG. 5 depicts the normalized cross-correlation between the two acceleration signals depicted in FIG. 4. A maximum is observed and highlighted with a circle at $\tau^*=0.14$ s. In this illustrative example, the estimated speed is 10.7 meters per second, which is within 5 percent error from the speed estimated using GPS. Negative values in the cross-correlation results presented in FIG. 5 may represent negative lag values which may be related to driving backwards (e.g., a peak with negative time lag).

Figure 6:
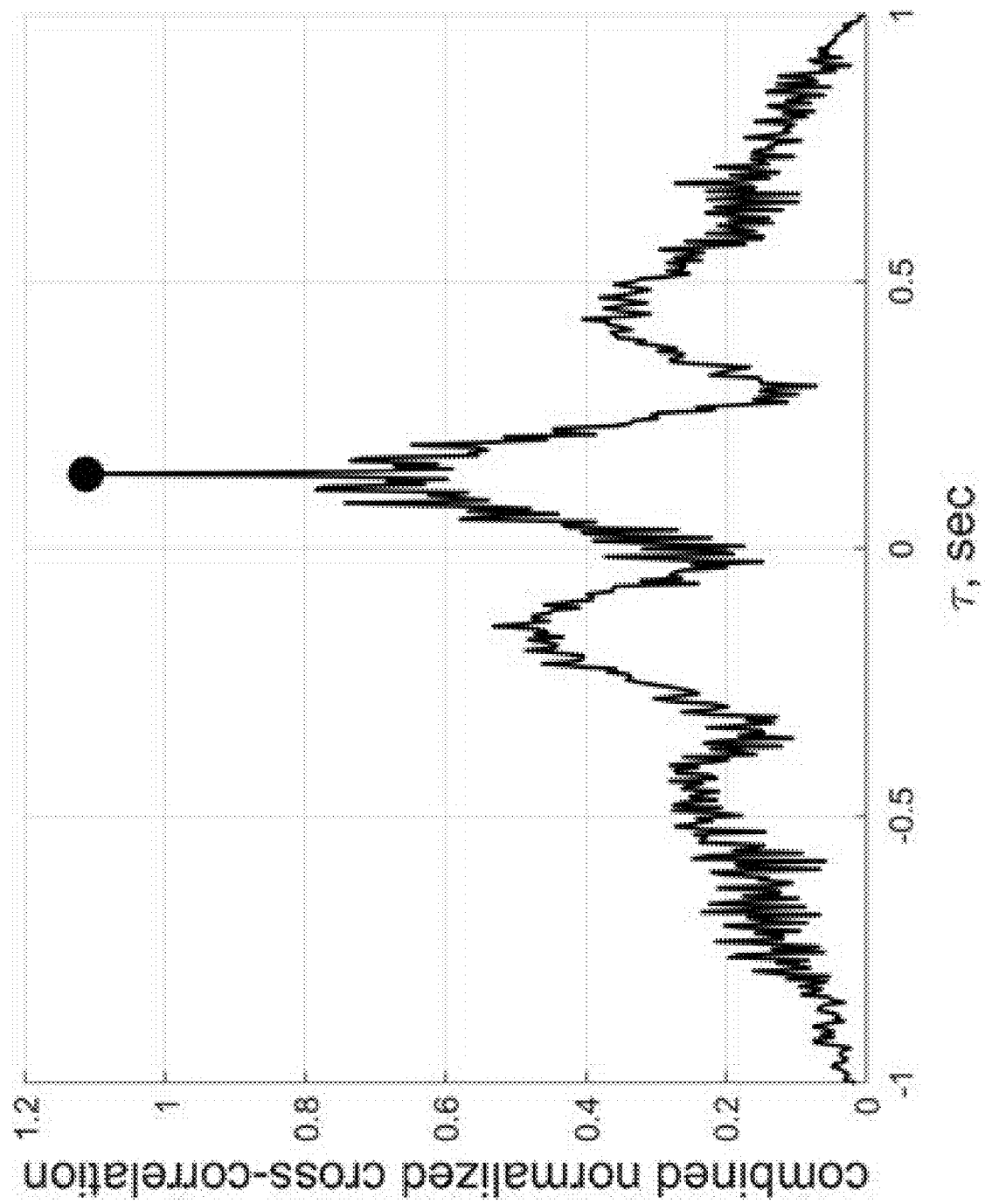
FIG. 6 depicts the combined normalized cross-correlation computed using all six channels provided by an inertial measurement unit (IMU) used in FIG. 4, according to some embodiments of the invention.

FIG. 6 depicts the combined normalized cross-correlation computed using all six channels provided by the IMU used in FIG. 4. The three acceleration and three angular velocity components were shifted as described with relation FIG. 4 and noise was added with a noise to signal ratio of five for each channel. Cross-correlation was computed for each pair of matching channels (acceleration in the x direction from IMU1 was used with acceleration in the x direction from IMU2, etc.) to produce a total of six cross-correlation curves versus lag time. The six curves were combined by taking the 2-norm at each lag time to produce a single curve (one dimensional curve) that is presented in FIG. 6. The combined graph clearly presents a distinct peak at the same lag time of 0.14 seconds. As can be seen by comparing FIG. 6 to FIG. 5, incorporating additional channels substantially strengthens the clarity of the cross-correlation peak.

Figure 7:
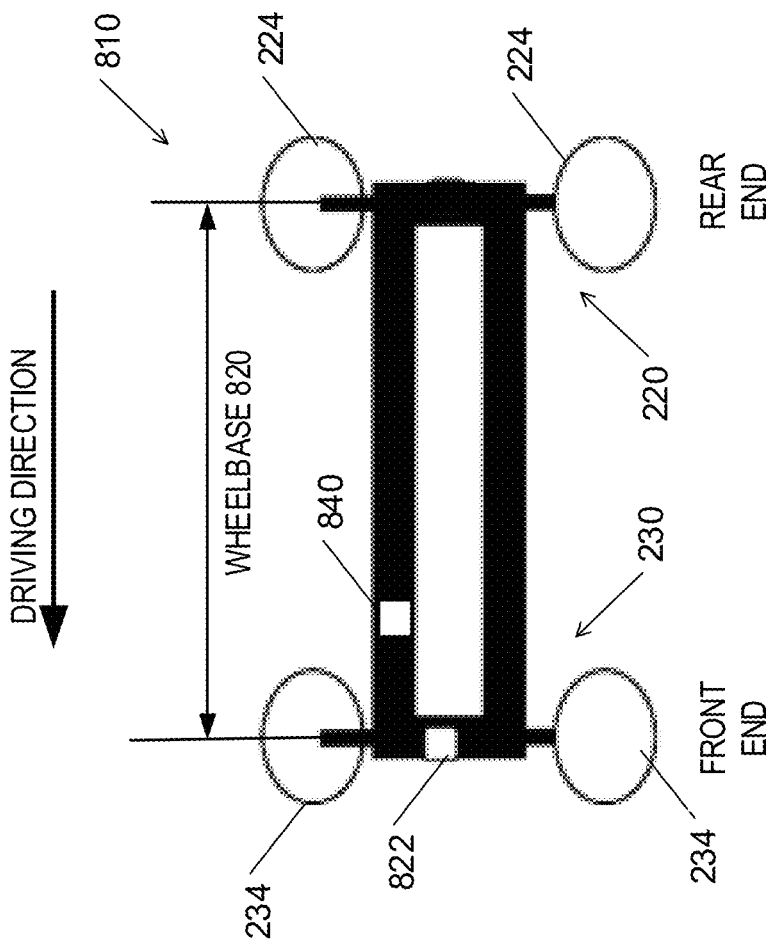
FIG. 7 depicts a vehicle, equipped with a single sensor unit, according to embodiments of the invention.

Reference is now made to FIG. 7 which depicts a vehicle 810, equipped with a single sensor unit 822 (e.g., including a single sensor unit or a plurality of sensor units whose measurements are unified or averaged), according to embodiments of the invention. Sensor unit 822 (that may be similar to sensor unit 112) may be physically attached to the body of vehicle 810. In some embodiments, sensor unit 822 is located or installed in front end 230 of vehicle 810, however this is not limiting and sensor unit 822 may be located anywhere in vehicle 810. Sensor unit 822 may include an accurate clock or may be provided with an accurate clock signal.

Vehicle 810, may further be equipped with processor 840, that may be configured to obtain readings of sensor unit 822, calculate a time difference between a time when a first irregularity is sensed by sensor unit 822 in a first location of the vehicle, e.g., in front end 230, and a time when the irregularity is sensed by the same sensor unit 822 in a second location of the vehicle, e.g., in rear end 220, and to calculate the velocity of vehicle 810 based on the time difference.

Figure 8A:
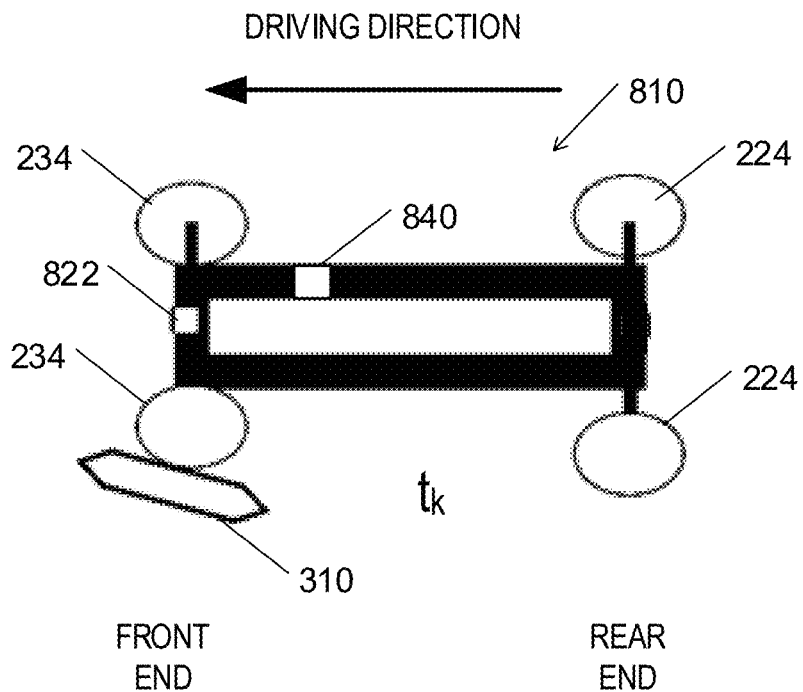
FIG. 8A depicts a vehicle when the front wheels of the vehicle are driving over a road imperfection, in time $t_k$, according to embodiments of the invention.
Figure 8B:
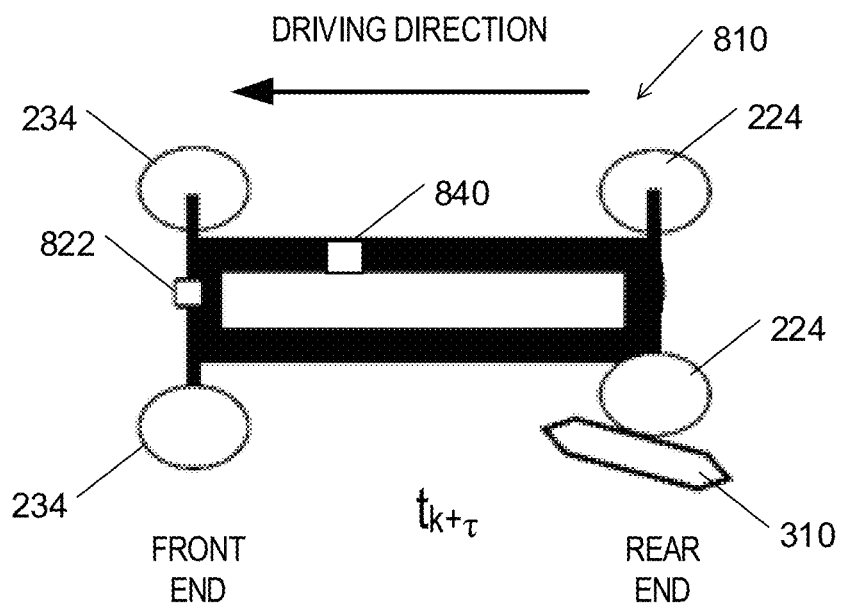
FIG. 8B depicts the vehicle when the rear wheels of the vehicle are driving over the road imperfection, in time $t_{k+\tau}$, according to embodiments of the invention.

Reference is now made to FIGS. 8A and 8B, which depict vehicle 810 driving over a road imperfection 310, according to embodiments of the invention. FIG. 8A depicts vehicle 810 when the front wheels 234 of vehicle 810 are crossing or driving over road imperfection 310, in time $t_k$. Vehicle 810 keeps moving and FIG. 8B depicts vehicle 810 when the rear wheels 224 of vehicle 810 are crossing or driving over road imperfection 310, in time $\tau_{k+\tau}$. Where $\tau$ denotes the time difference or time lag between the point in time in which the front wheels 234 of vehicle 810 are crossing or driving over road imperfection 310 and the point in time the rear wheels 224 of vehicle 810 are crossing or driving over road imperfection 310.

According to embodiments of the invention, a single sensor unit 822 installed on vehicle 810 may be used for measuring the velocity of vehicle 810. Sensor unit 822 may capture road imperfection 310 as it is observed by both the front wheels 234 and rear wheels 224.

It may be assumed that when the front wheels 234 of vehicle 810 are crossing or driving over road imperfection 310, as depicted in FIG. 8A, a change in accelerations and angular rates of vehicle 210 may occur. This change in accelerations and angular rates of vehicle 810 may be sensed, picked or measured by sensor unit 822. Thus, a change in accelerations and angular rates of vehicle 810 may be manifested in at least one signal measured by sensor unit 822, e.g., as an irregularity. Similarly, it may be assumed that when the rear wheels 224 of vehicle 810 are crossing or driving over road imperfection 310, as depicted in FIG. 8B, a change in accelerations and angular rates of vehicle 810 may occur. This change in accelerations and angular rates of vehicle 810 may be sensed, picked or measured by sensor unit 822. Thus, a change in accelerations and angular rates of vehicle 810 may be manifested in at least one signal measured by sensor unit 822, e.g., as an irregularity. The time difference between the irregularities measured by sensor unit 822 may depend on the velocity of vehicle 810 and the longitudinal distance between the front wheels 234 and rear wheels 224, e.g., wheelbase 820. Since wheelbase 820 is known, the velocity of vehicle 810 may be calculated by finding the time difference, and solving the equations of motion, e.g., dividing the wheelbase 820 by the time difference.

Thus, when driving forward, perturbations that originate at front wheels 234 reach the rear wheels 224 after a period of time (e.g., a time lag) that depends on the distance between the wheels 234 and 224, e.g., wheelbase 820, and the vehicle velocity. Thus, a single imperfection 310 may be manifested twice in a signal measured by sensor unit 822 successively, with a time lag between the two manifestations. When a certain imperfection is sufficiently large in magnitude and is not lost beneath the noise of the sensor (e.g., can be distinguished and detected), an autocorrelation of a signal measured by sensor unit 822 may reveal a distinct peak (other than the peak naturally located at time zero) at the time lag.

For example, the autocorrelation A may be calculated by:

$$A(\tau) \triangleq E[x_{k-\tau} y_k^T]$$

$$A(\tau) \cong \frac{1}{ws} \sum_{i=k-ws+1}^{k} x_{i-\tau} x_i$$

$$\tau_k^* = \max_\tau A_k(\tau)$$

Where $x_k \triangleq a_z^{IMU1}$ is the acceleration in the direction of the z-axis measured by sensor unit 822. The velocity of the vehicle 210 may be estimated using the time lag and wheelbase, using for example:

$$\tau_k^* = \frac{\text{wheelbase}}{\text{vehicle velocity}_k}$$

Figure 9:
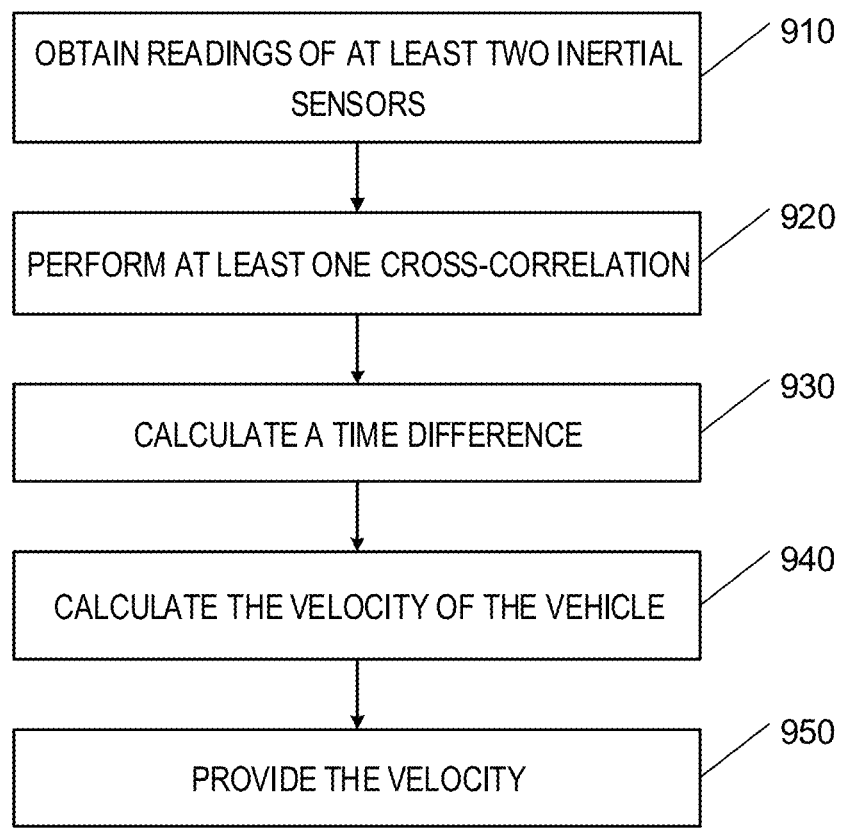
FIG. 9 shows a flowchart of a method for estimating a velocity of a vehicle using at least two inertial sensors, according to some embodiments of the present invention.

FIG. 9 shows a flowchart of a method for estimating a velocity of a vehicle using at least two inertial sensors, according to some embodiments of the present invention. The operations of FIG. 9 may be performed by the systems described in FIGS. 1A, 2, 3A, 3B and 11, but other systems may be used.

In operation 910, a processor, e.g., processor 240 may obtain readings of at least two inertial sensors, e.g., front sensor unit 232 and rear sensor unit 222, that are attached to a vehicle, e.g., vehicle 210. The reading obtained from a single sensor may include one or more of the accelerations and angular velocities at x, y and z directions measured by the sensor over time. According to embodiments of the invention, the at least two inertial sensor units may be located collinearly on a line parallel to a longitudinal axis of the vehicle, with a distance between them. For example, a first inertial sensor unit may be located in a front end of the vehicle, and a second inertial sensor unit may be located in a rear end of the vehicle.

In operation 920, the processor may perform at least one cross-correlation, where each cross-correlation is calculated between a signal measured by the first inertial sensor unit and a corresponding signal measured by the second inertial sensor unit. The cross-correlation may be calculated over time windows of the measured signals, and provided as a signal over time. In some embodiments, a cross-correlation between accelerations measured in a vertical direction (z direction) by the first inertial sensor unit and accelerations measured in a vertical direction by the second inertial sensor unit is calculated. In some embodiments, more than one cross-correlation is calculated. For example, cross-correlation between one or more of the accelerations and angular velocities at x, y and z directions measured by the first inertial sensor unit and a corresponding accelerations and angular velocities at x, y and z directions measured by the second inertial sensor unit may be calculated.

In operation 930, the processor may calculate or find a time difference between a time when an irregularity is sensed in a first location of the vehicle and a time when the irregularity is sensed in a second location of the vehicle. For example, the processor may find a peak in a cross-correlation signal where the time difference may be the time associated with the peak. If more than one cross-correlation signals are calculated, the cross-con-elation signals may be arranged in a matrix and the time difference may equal a time lag that optimizes a matrix property, e.g., 2-norm.

In operation 940, the processor may calculate the velocity of the vehicle based on the time difference and the wheelbase. For example, for each two sensors, the processor may divide the wheelbase by the time lag. In operation 950 the processor may provide the velocity to a localization and navigation system, e.g., to navigation server 130, or to a user.

Figure 10:
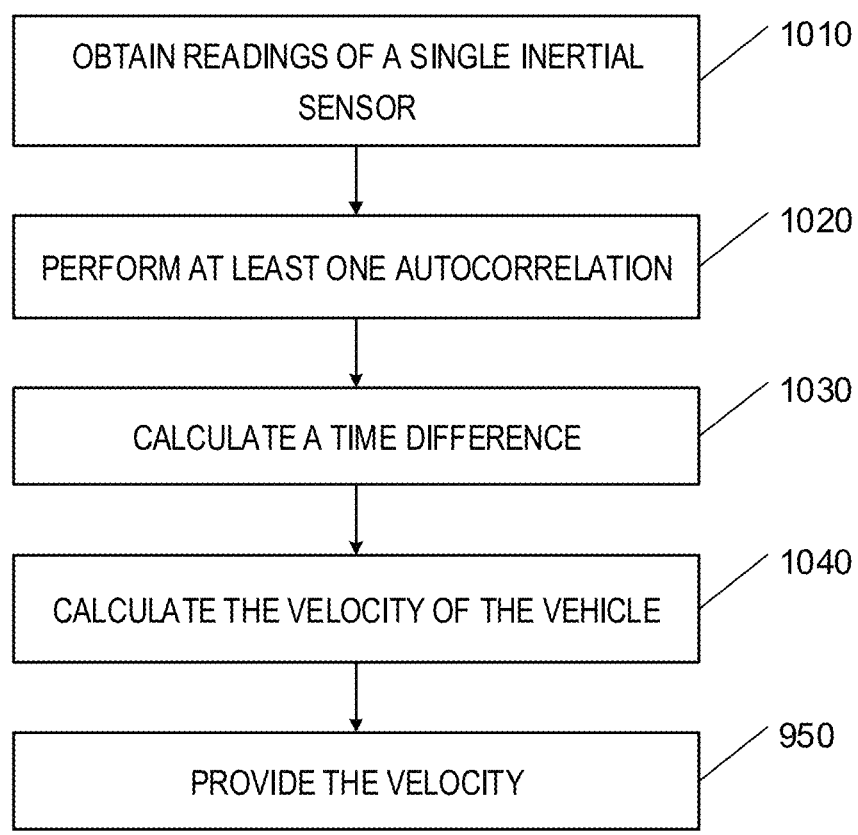
FIG. 10 shows a flowchart of a method for estimating a velocity of a vehicle using a single inertial sensor, according to some embodiments of the present invention.

FIG. 10 shows a flowchart of a method for estimating a velocity of a vehicle using a single inertial sensor, according to some embodiments of the present invention. The operations of FIG. 9 may be performed by the systems described in FIGS. 1A, 2, 8A, 8B and 11, but other systems may be used.

In operation 1010, a processor, e.g., processor 840 may obtain readings of a single inertial sensor, e.g., sensor unit 822, that may be attached to a vehicle, e.g., vehicle 810. The reading obtained from the single sensor may include one or more of the accelerations and angular velocities at x, y and z directions measured by the sensor over time. In operation 1020, the processor may perform at least one autocorrelation, where each autocorrelation is calculated for a signal measured by the inertial sensor unit. The autocorrelation may be calculated over time windows of the measured signals, and provided as a signal over time. In some embodiments, an autocorrelation of accelerations measured in a vertical direction (z direction) by the inertial sensor unit is calculated. In some embodiments, more than one autocorrelation is calculated. For example, autocorrelation of one or more of the accelerations and angular velocities at x, y and z directions measured by the inertial sensor unit may be calculated.

In operation 1030, the processor may calculate or find a time difference between a time when an irregularity is sensed in a first location of the vehicle and a time when the irregularity is sensed in a second location of the vehicle. For example, the processor may find a peak in an autocorrelation signal where the time difference may be the time associated with the peak. If more than one autocorrelation signals are calculated, the autocorrelation signals may be arranged in a matrix and the time difference may equal a time lag that optimizes a matrix property, e.g., 2-norm.

In operation 1040, the processor may calculate the velocity of the vehicle based on the time difference and wheelbase of the vehicle. For example, the processor may divide the wheelbase by the time difference. In operation 950 the processor may provide the velocity to a localization and navigation system, e.g., to navigation server 130, or to a user.

Figure 11:
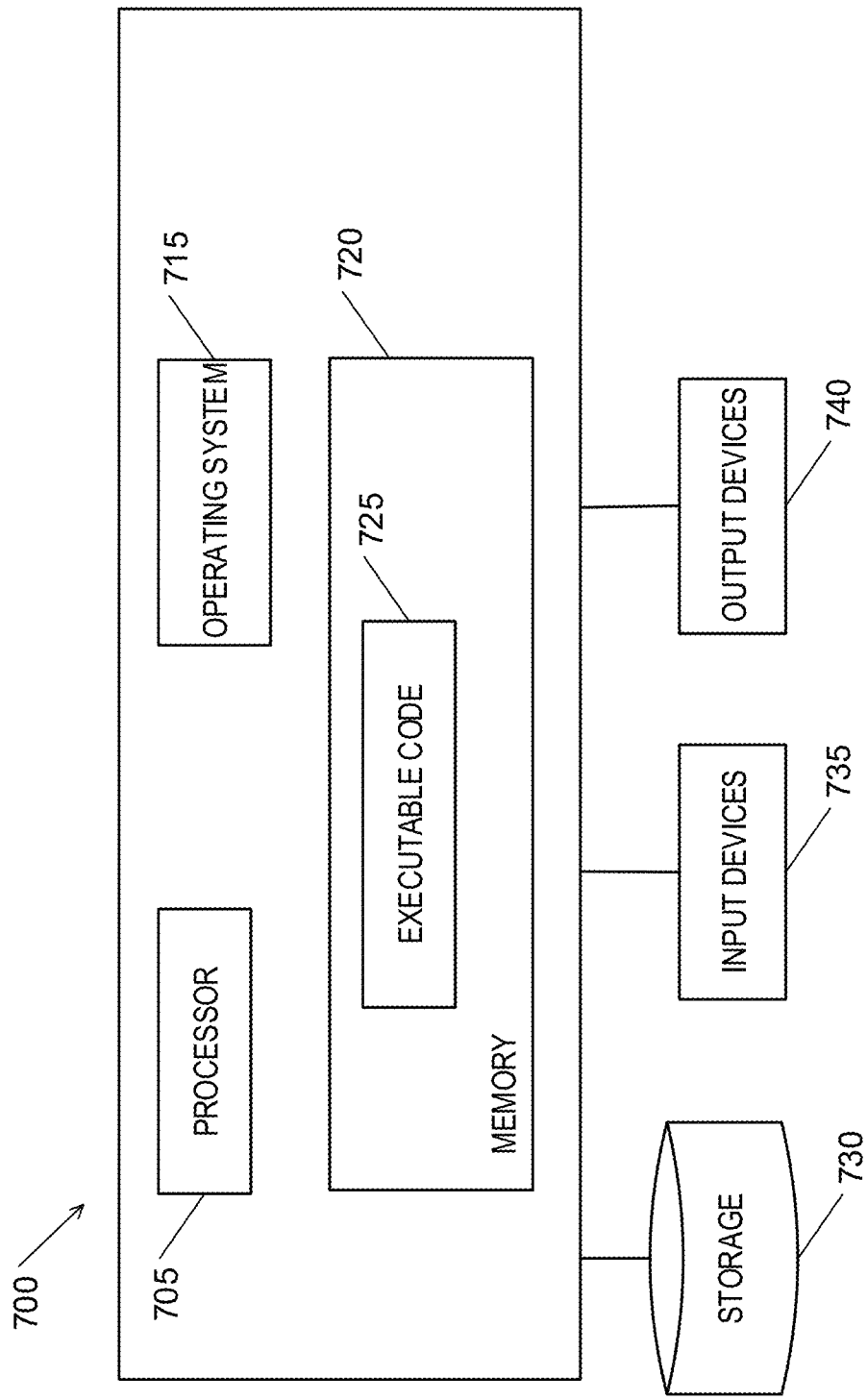
FIG. 11 shows a high-level block diagram of an exemplary computing device according to some embodiments of the present invention.

Reference is made to FIG. 11, showing a high-level block diagram of an exemplary computing device according to some embodiments of the present invention. Computing device 700 may include a processor 705 that may be, for example, a central processing unit processor (CPU) or any other suitable multi-purpose or specific processors or controllers, a chip or any suitable computing or computational device, an operating system 715, a memory 120, executable code 725, a storage system 730, input devices 735 and output devices 740. Processor 705 (or one or more controllers or processors, possibly across multiple units or devices) may be configured to carry out methods described herein, and/or to execute or act as the various modules, units, etc. for example when executing code 725. More than one computing device 700 may be included in, and one or more computing devices 700 may be, or act as the components of, a system according to embodiments of the invention. Various components, computers, and modules of FIGS. 1, 2, 3A, 3B, 8A and 8B may include devices such as computing device 700, and one or more devices such as computing device 700 may carry out functions such as those described in FIGS. 9 and 10. For example, navigation server 130 and processors 114 may be implemented on or executed by a computing device 700.

Operating system 715 may be or may include any code segment (e.g., one similar to executable code 725) designed and/or configured to perform tasks involving coordination, scheduling, arbitration, controlling or otherwise managing operation of computing device 700, for example, scheduling execution of software programs or enabling software programs or other modules or units to communicate.

Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory or storage units. Memory 720 may be or may include a plurality of, possibly different memory units. Memory 720 may be a computer or processor non-transitory readable medium, or a computer non-transitory storage medium, e.g., a RAM.

Executable code 725 may be any executable code, e.g., an application, a program, a process, task or script. Executable code 725 may be executed by processor 705 possibly under control of operating system 715. For example, executable code 725 may configure processor 705 to estimate a velocity of a vehicle using readings of one or more inertial sensors, and perform other methods as described herein. Although, for the sake of clarity, a single item of executable code 725 is shown in FIG. 11, a system according to some embodiments of the invention may include a plurality of executable code segments similar to executable code 725 that may be loaded into memory 720 and cause processor 705 to carry out methods described herein.

Storage system 730 may be or may include, for example, a hard disk drive, a CD-Recordable (CD-R) drive, a Blu-ray disk (BD), a universal serial bus (USB) device or other suitable removable and/or fixed storage unit. Data such as the measured velocities as well as other data required for performing embodiments of the invention, may be stored in storage system 730 and may be loaded from storage system 730 into memory 720 where it may be processed by processor 705. Some of the components shown in FIG. 11 may be omitted. For example, memory 720 may be a non-volatile memory having the storage capacity of storage system 730. Accordingly, although shown as a separate component, storage system 730 may be embedded or included in memory 720.

Input devices 735 may be or may include a mouse, a keyboard, a microphone, a touch screen or pad or any suitable input device. Any suitable number of input devices may be operatively connected to computing device 700 as shown by block 735. Output devices 740 may include one or more displays or monitors, speakers and/or any other suitable output devices. Any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a printer, a universal serial bus (USB) device or external hard drive may be included in input devices 735 and/or output devices 740.

In some embodiments, device 700 may include or may be, for example, a personal computer, a desktop computer, a laptop computer, a workstation, a server computer, a network device, a smartphone or any other suitable computing device. A system as described herein may include one or more devices such as computing device 700.

Figure 12:
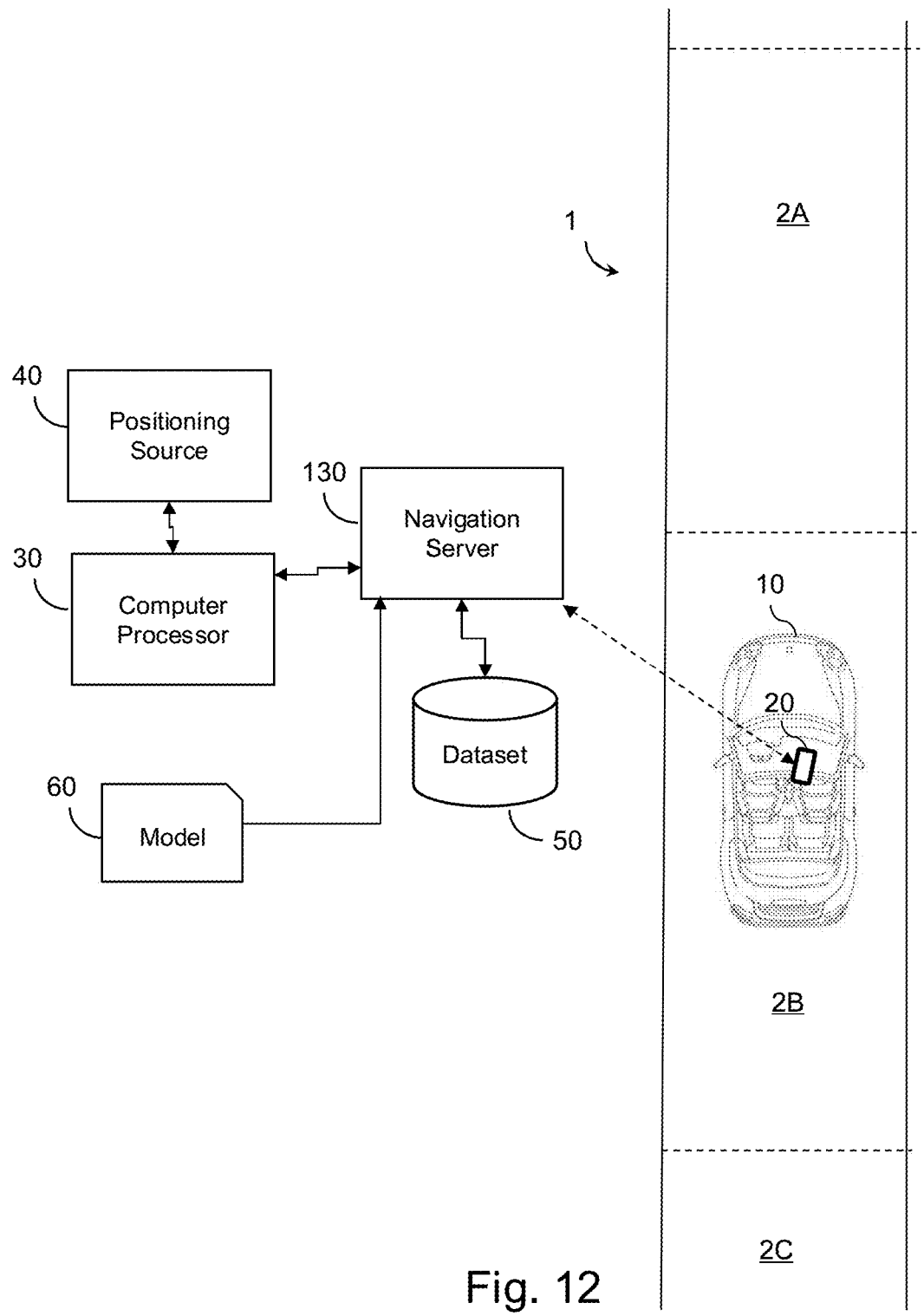
FIG. 12 presents a system for providing localization of a vehicle in further details, according to some embodiments of the invention.

FIG. 12 presents a system for providing localization of a vehicle in further details, according to some embodiments of the invention. According to some embodiments of the present invention, a system of training a deep learning neural network (DL NN) model for determining a location of a vehicle moving along a known route in terms of geographic location, based on inertial measurement unit (IMU) measurements is implemented by navigation server 130. The system may include: an IMU 20 within a vehicle 10 configured to measure a series of angular velocities and accelerations sensed at a plurality of locations for each section of a plurality of sections 2A to 2C along route 1; a computer processor 30 configured to calculate, for each of sections 2A to 2C along route 1, and based on the series of angular velocities and accelerations sensed at the plurality of locations in one of the sections, a kinematic signature which is unique to the one of the sections, compared with kinematic signatures of rest of the sections; and a positioning source 40 other than IMU 20 configured to obtain a positioning measurement of vehicle 10 for each of the sections 2A to 2C, wherein the computer processor 30 is further configured to associate each one of the kinematic signatures with a respective positioning measurement obtained via the positioning source other than the IMU, and wherein the computer processor is further configured to train a deep learning neural network (DL NN) model using a dataset 50 comprising the kinematic signatures associated with the respective positioning measurements, to yield trained DL NN model 60.

According to some embodiments of the invention, navigation server 130 may be further configured to, during a runtime phase, obtain runtime accelerations and angular velocities over time of a vehicle 110 moving in the defined area or route 120 and use the trained model to obtain current location of vehicle 110 based on the runtime acceleration and angular velocities.

According to some embodiments of the invention, navigation server 130 may be further configured to, during the training phase, extract features from the accelerations and angular velocities of the training dataset and add the features to the training dataset. For example, the features may include velocity, horizontal slope and/or other features. Navigation server 130 may be further configured to, during the runtime phase, extract the same type of features from the runtime accelerations and angular velocities, and use the trained model to obtain the current location of the vehicle 112 based on the runtime acceleration, the runtime angular velocities and the runtime features.

According to some embodiments of the invention, navigation server 130 may have mapping of the defined area or route 120. In some embodiments, navigation server 130 may divide the mapping of the defined area or route 120 into segments and may provide or express the location of vehicle 110 a segment in which the vehicle 110 is located When discussed herein, "a" computer processor performing functions may mean one computer processor performing the functions or multiple computer processors or modules performing the functions; for example, a process as described herein may be performed by one or more processors, possibly in different locations.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for estimating a velocity of a vehicle, the method comprising:
obtaining a first set of three-dimensional readings from a first inertial sensor at a first vehicle location attached to the vehicle and a second set of three-dimensional readings from a second inertial sensor at a second location attached to the vehicle, wherein the distance between the first location of the vehicle and the second location of the vehicle is equal to or smaller than a wheelbase of said vehicle, wherein each of the first set of three-dimensional readings and the second set of three-dimensional readings comprise at least one of: acceleration and angular velocity of the vehicle along one of three mutually perpendicular axes;
calculating, using a computer processor, a time difference between a first time when an irregularity is sensed in the first location of the vehicle by the first inertial sensor and a second time when the irregularity is sensed in the second location of the vehicle by the second inertial sensor, wherein the time difference is based on a cross-correlation of the first set of three-dimensional readings at the first time and the second set of three-dimensional readings at the second time; and
calculating, using said computer processor, the velocity of the vehicle based on the time difference.

2. The method of claim 1, wherein each of the first inertial sensor and the second inertial sensor measures at least one of accelerations and angular velocities at x, y and z directions.

3. The method of claim 1, wherein each of the first inertial sensor and the second inertial sensor includes an accelerometer or a gyroscope.

4. The method of claim 3, wherein calculating the time difference for at least one of the first inertial sensor and the second inertial sensor comprises:
performing autocorrelation of an acceleration or autocorrelation of an angular velocity signal measured by the respective inertial sensor unit; and
finding a peak in the autocorrelation signal,
wherein the time difference is a time associated with the peak.

5. The method of claim 1, wherein calculating the velocity comprises: dividing a wheelbase of the vehicle by the time difference.

6. The method of claim 1, wherein the first inertial sensor and the second inertial sensor are located collinearly on a line parallel to a longitudinal axis of the vehicle, with a distance between them.

7. The method of claim 1, wherein calculating the cross correlation comprises:
performing cross-correlation between an acceleration signal measured by the first inertial sensor and a corresponding acceleration signal measured by the second inertial sensor; and
finding a peak in the cross-con-elation signal,
wherein the time difference is a time associated with the peak.

8. The method of claim 1, wherein calculating the cross correlation comprises:
performing cross-correlation between each one of three acceleration signals and three angular velocities measured by the first inertial sensor and a corresponding signal measured by the second inertial sensor;
arranging the cross-correlation signals in a matrix; and
calculating a time lag that optimizes a matrix property.

9. The method of claim 1, wherein the first inertial sensor and the second inertial sensor unit are located collinearly on a single axle of the vehicle, to measure skid, understeer or oversteer.

10. A system for estimating a velocity of a vehicle, the system comprising:
a memory; and
a computer processor configured to;
obtain a first set of three-dimensional readings from a first inertial sensor at a first vehicle location attached to the vehicle and a second set of three-dimensional readings from a second inertial sensor at a second location attached to the vehicle, wherein the distance between the first location of the vehicle and the second location of the vehicle is equal to or smaller than a wheelbase of said vehicle three-dimensional readings and the second set of three-dimensional readings comprise at least one of: acceleration and angular velocity of said vehicle along one of three mutually perpendicular axes;
calculate a time difference between a first time when an irregularity is sensed in the first location of the vehicle by the first inertial sensor and a second time when the irregularity is sensed in the second location of the vehicle by the second inertial sensor, wherein the time difference is based on a cross-correlation of the first set of three-dimensional readings at the first time and the second set of three-dimensional readings at the second time; and
calculate the velocity of the vehicle based on the time difference.

11. The system of claim 10, wherein the first inertial sensor and the second inertial sensor includes an accelerometer or a gyroscope.

12. The system of claim 11, wherein the processor is configured to calculate the time difference for at least one of the first inertial sensor and the second inertial sensor by:
performing autocorrelation of an acceleration or autocorrelation of an angular velocity signal measured by the respective inertial sensor unit; and
finding a peak in the autocorrelation signal,
wherein the time difference is a time associated with the peak.

13. The system of claim 10, wherein the processor is configured to calculate the velocity by: dividing a wheelbase of the vehicle by the time difference.

14. The system of claim 10, wherein the first inertial sensor and the second inertial sensor are located collinearly on a line parallel to a longitudinal axis of the vehicle, with a distance between them.

15. The system of claim 10, wherein the processor is configured to calculate the cross correlation by:
performing cross-correlation between an acceleration signal measured by the first inertial sensor and a corresponding acceleration signal measured by the second inertial sensor; and
finding a peak in the cross-con-elation signal,
wherein the time difference is a time associated with the peak.

16. The system of claim 10, wherein the processor is configured to calculate the by:
performing cross-correlation between each one of three acceleration signals and three angular velocities measured by the first inertial sensor and a corresponding signal measured by the second inertial sensor;
arranging the cross-correlation signals in a matrix; and
calculating a time lag that optimizes a matrix property.

* * * * *